United States Patent [19]

Connell

[11] 4,328,997
[45] May 11, 1982

[54] VEHICLE WHEEL TRIM

[76] Inventor: James Connell, 5017 Dianna Dr., Bloomfield Hills, Mich. 48013

[21] Appl. No.: 86,004

[22] Filed: Oct. 17, 1979

[51] Int. Cl.³ .............................................. B60B 7/06
[52] U.S. Cl. ..................................... 301/37 P; 24/294
[58] Field of Search .......................... 24/73 HC, 73 B; 301/37 R, 37 P, 37 T, 37 TP, 37 PB, 108 R, 108 A

[56] References Cited

U.S. PATENT DOCUMENTS

| 3,771,834 | 11/1973 | Kretschmer | 301/37 P |
| 3,788,707 | 1/1974 | Connell | 301/37 P |
| 3,794,385 | 2/1974 | Kretschmer | 301/37 P |
| 3,860,296 | 1/1975 | Spisak | 301/37 P |
| 3,876,257 | 4/1975 | Buerger | 301/37 P |
| 3,970,346 | 7/1976 | Kretschmer | 301/37 R |
| 3,999,268 | 12/1976 | Jacobs | 301/37 T |
| 4,146,273 | 3/1979 | Spisak | 301/37 R |
| 4,149,754 | 4/1979 | Beisch et al. | 301/37 R |

Primary Examiner—H. Grant Skaggs
Attorney, Agent, or Firm—Neal A. Waldrop; Jay C. Taylor

[57] ABSTRACT

A vehicle wheel trim assembly comprises a molded flange member of hard, lightweight plastic material adapted to provide a form-sustaining backing and reinforcement for a thin outer ornamental layer and has an axial flange portion adapted to fit coaxially within an annular axial flange of a vehicle wheel. The axial flange portion of the trim assembly carries a plurality of circumferentially spaced resilient retainers adapted to engage the wheel flange yieldably at an interference fit for securing the flange member to the wheel.

5 Claims, 16 Drawing Figures

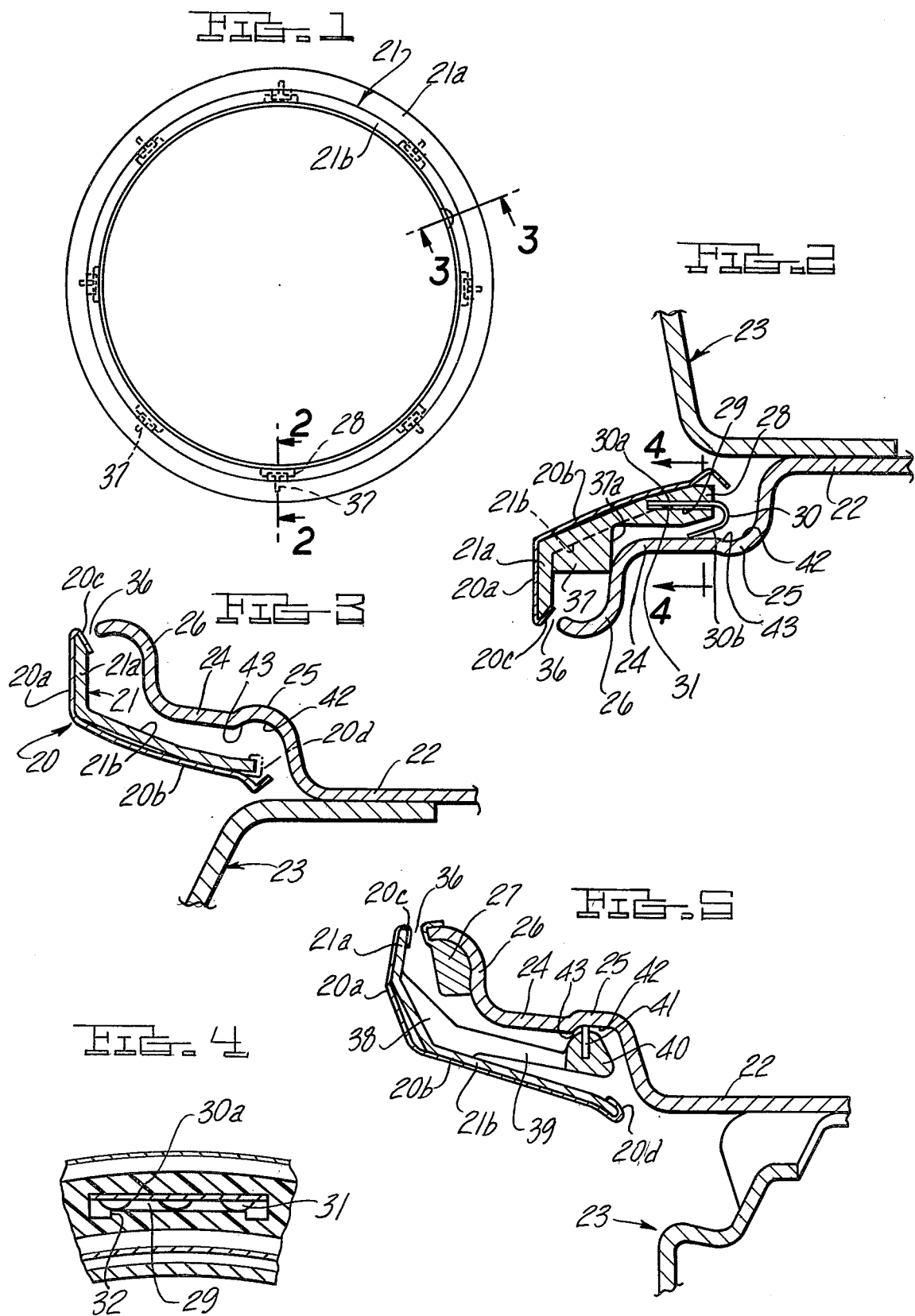

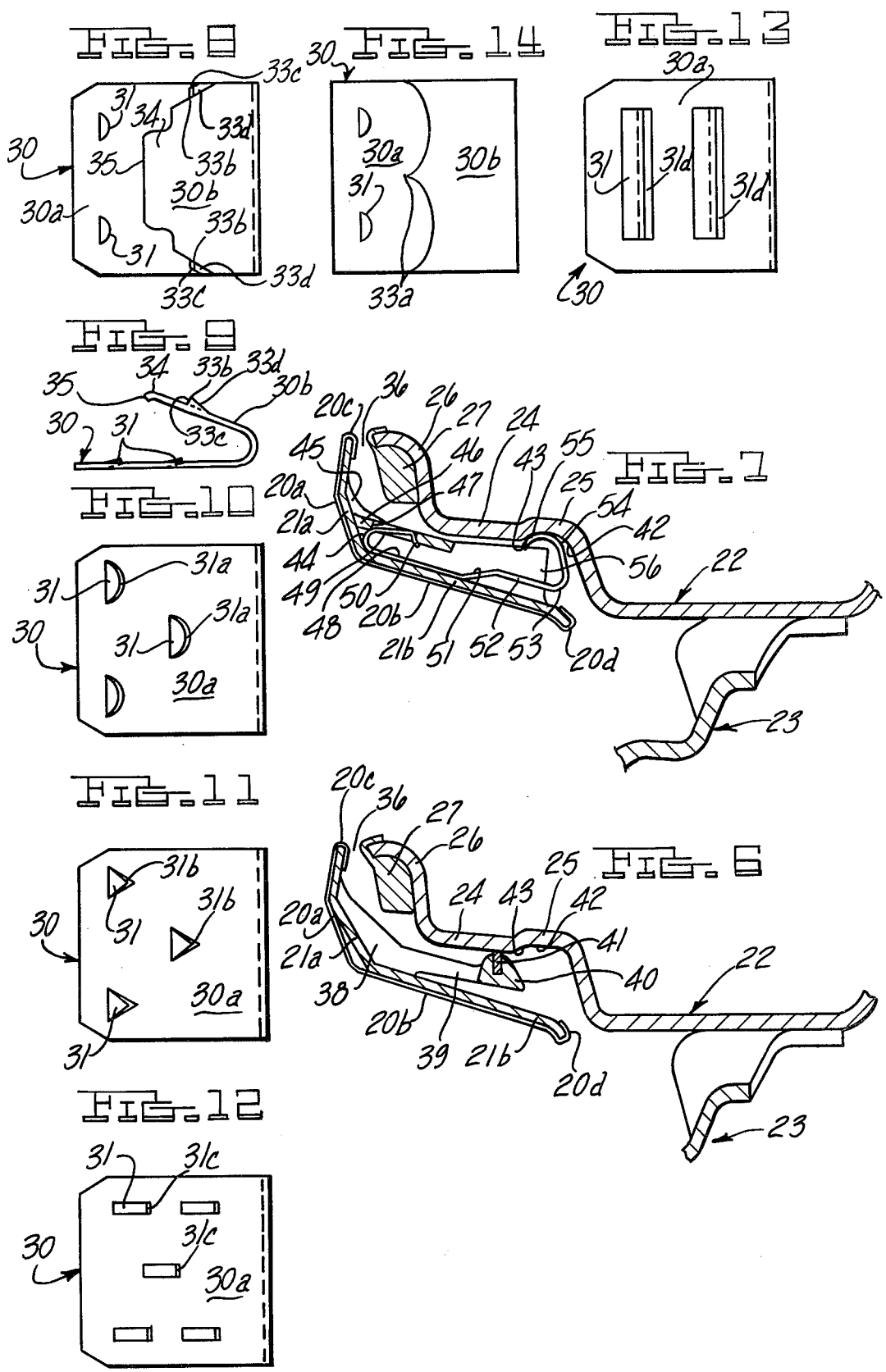

VEHICLE WHEEL TRIM

SUMMARY AND BACKGROUND OF THE INVENTION

This invention relates to improvements in an ornamental trim assembly and retention means for securing the assembly to a vehicle wheel. Ornamental wheel trims or covers of stainless steel and the like and numerous devices for securing the trim to the wheel have long been in use. Such covers have been characterized by heavy, complex and costly constructions.

Primary objects of the present invention are to provide a comparatively simple and inexpensive wheel trim assembly of improved construction having the ornamental appearance of a conventional wheel trim and a particularly simple and effective retention means whereby the assembly may be readily secured to a vehicle wheel or removed therefrom as desired.

Another object is to provide such a wheel trim assembly comprising a thin outer ornamental layer of bright or decorative appearance and also comprising a molded backing and reinforcement of hard, lightweight plastic material for the ornamental layer.

Another object is to provide a wheel trim assembly comprising a flange member molded from said plastic material to provide an integral annular axial portion adapted to fit freely and coaxially within a conventional annular flange of a vehicle wheel. The axial flange portion is formed with a plurality of radially shallow circumferentially spaced recesses associated with a corresponding plurality of J-shaped spring steel retention clips. Each recess opens axially inwardly to receive a flat, barbed leg of the associated retention clip. A plurality of sharp edged barbs or tabs are lanced from the plane of the flat leg to extend radially and axially inwardly to their sharp edges from resilient connections with the flat leg. The barbs or tabs are dimensioned to effect an interference fit with the adjacent wall of the shallow recess and to embed therein to resist their removal, but are resiliently yieldable to enable the initial insertion of the flat leg of the clip into the associated shallow recess.

When the flat barbed leg of the clip is secured within its associated shallow recess, the bight of the J-shaped clip extends closely around the axially inner edge of the molded axial flange portion to comprise a resilient connection between the flat barbed leg and a shorter retaining leg that extends radially and axially outwardly to a sharp pronged end for yieldingly engaging and embedding into the axial wheel flange at an interference fit.

In accordance with the structure of the J-shaped clip, including the flat barbed leg fixed within the shallow recess, and the shorter retaining leg engageable with the wheel flange, an efficient retention means of minimum radial dimension is achieved which is thus suitable for use with a wide range of vehicle wheel types wherein the radial clearance within the axial wheel flange is too small for conventional retainers. Also the structure described materially simplifies the structure of the molded axial flange portion of the trim assembly as well as the molding operation and the mold required.

In regard to the clearance required for the retention means, mass-produced wheels of even the same kind vary appreciably in size as a result of the customary stack-up of allowable dimensional tolerances. Accordingly it is difficult to predetermine the precise position of the trim assembly relative to the wheel when secured thereto.

Another object is to provide an improved molded flange member for the trim assembly having a radial flange portion extending radially from an axially outer portion of the aforesaid axial flange portion. A plurality of circumferentially spaced reinforcing webs of said molded material are molded integrally with the radial and axial flange portions to maintain the angular relationship therebetween. Each web is formed with a radial shoulder adapted to engage an annular flange of the wheel and limit the axial inward movement of the trim assembly when the latter is attached to the wheel, thereby to predetermine the relative position of the trim assembly on the vehicle. In consequence, the trim assembly will be secured to the wheel at a predetermined location selected to assure the desired ornamental appearance and also to assure effective retention and to enable removal of the assembly when desired without undue difficulty.

Another object is to assure an effective engagement between the tabs of the flat leg of the retention clip and the adjacent wall of the associated recess by providing an enlargement of the recess at a location confronting a portion of the sharp edge of at least one of the tabs such that the surface area of the hard molded material engaged by the tab is reduced with the result that the sharp edge of the tab will engage a small localized area of the hard molded material and effectively embed thereinto.

Another object is to provide an improved resilient clip that interengages the wheel flange when the trim assembly is secured to the wheel and which provides one cam for springing the clip to facilitate its attachment to the wheel and a second cam for springing the clip to enable its removal from the wheel, wherein the clip is shaped and dimensionsed to cooperate with the cams so that greater force is required for removal of the clip from the wheel than is required for attachment of the clip to the wheel.

Other objects are to provide an improved retention device for the plastic flange member comprising a plurality of circmferentially spaced resilient arms of said plastic material molded integrally with the flange member, the arms having integral resiliently yieldable end portions for supporting a plurality of small metallic nails or spikes that resiliently engage and embed radially into the wheel flange when the trim assembly is secured to the wheel. Spring steel retention clips are avoided and the entire flange member, except for the small spikes, comprises the hard, lightweight molded plastic material. The inherent resiliency of the latter material is utilized to effect the attachment with the wheel.

The end of each plastic spring arm may comprise a separate integral spike support when the resiliency of the plastic material is adequate to effect the desired embedding of the nails into the wheel flange. In a preferred embodiment of the invention, the spike supporting ends of the spring arms are formed to comprise a unitary annular spike support coaxial with the wheel flange when the trim assembly is secured thereto. The annular support is dimensionsed in its unstressed condition prior to attachment of the trim assembly to the wheel so that the spring force of the plastic spring arms urging the spikes radially into engagement with the wheel flange is augmented by the resiliently distorted annular support when the trim assembly is secured to the wheel.

Other objects of this invention will appear in the following description and appended claims, reference being had to the accompanying drawings forming a part of this specification wherein like reference characters designate corresponding parts in the several views.

THE PRIOR ART

The following U.S. patents are representative of the state of the art and are concerned generally with the problems confronted by applicant, but fail to anticipate applicant's invention, as noted below. It is requested that the following patents be made of record in this case.

Kretschmer U.S. Pat. Nos. 3,771,834, 3,794,385, 3,873,161, 3,970,346 and Connell U.S. Pat. No. 4,003,604 show steel clips interlocked with a plastic wheel ring, but have neither the conservative radial dimension of applicant's flat barbed leg 30 as illustrated in his FIG. 2, nor any structure comparable to applicant's yieldable clip portions 51, 52 cooperable with the yieldable clip portion that extends radially from his loop 53, FIG. 7, to accomplish the dual functions: (a) to reduce the force required to depress the portions 51, 52 and facilitate attachment of the trim assembly to the vehicle wheel, and (b) to increase that force during removal of the trim assembly to resist the removal.

Connell, U.S. Pat. No. 3,288,707, shows a resilient plastic retention device engageable within a channel on the vehicle wheel, but is otherwise entirely unrelated to the present invention and has neither applicant's dual resiliency characteristic noted above nor the simple integral molded spring arm 39 feature of applicant's FIGS. 5 and 6.

BRIEF DESCRIPTION OF THE DRAWINGS

FIG. 1 is an elevational view of an annular wheel trim assembly embodying the present invention, looking at the inner face that confronts the vehicle wheel.

FIG. 2 is an enlarged fragmentary sectional view taken in the direction of the arrows essentially along the line 2—2 of FIG. 1, showing the trim assembly secured to a vehicle wheel.

FIG. 3 is a view similar to FIG. 2, but taken in the direction of the arrows essentially along the line 3—3 of FIG. 1.

FIG. 4 is a sectional view showing details of one of the spring steel retention clips secured within a recess in the plastic support for the metallic trim member.

FIGS. 5, 6 and 7 are sectional views similar to FIG. 2, but taken at the top of the wheel and showing modifications of the retention means.

FIG. 8 is a plan view of a spring steel retention clip embodying the present invention and suitable for use in the assemblies illustrated in FIGS. 2 and 16.

FIG. 9 is a side elevation of the clip shown in FIG. 8.

FIG. 10 is a view of the clip shown in FIG. 8, taken from the underside of FIG. 9.

FIGS. 11, 12 and 13 are views similar to FIG. 10, showing modifications.

FIG. 14 is a plan view similar to FIG. 8, showing a modification.

Figure 15:
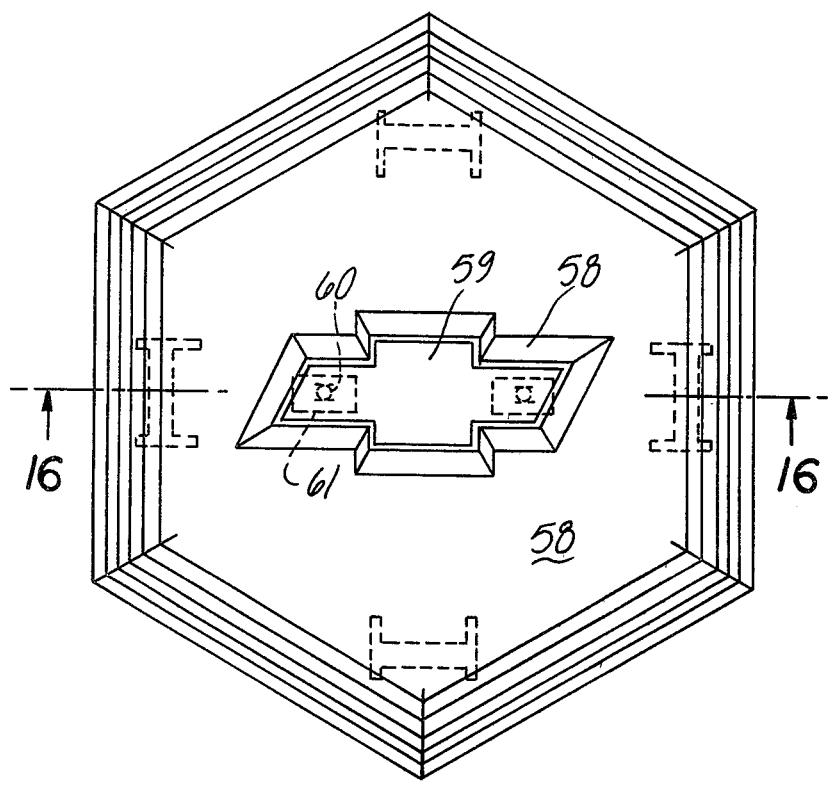
FIG. 15 is a view of the exterior face of an adaptation of the present invention for covering the hub of a vehicle wheel.

It is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

DETAILED DESCRIPTION OF THE INVENTION

Referring to the drawings and to FIGS. 1–4 in particular, the invention comprises an annular metallic trim ring or member 20, which may be formed from thin lightweight sheet metal, backed and reinforced by an annular flange member 21 of comparatively hard lightweight form-sustaining molded plastic material shaped to conform generally to the contour of member 20. The trim member 20 may have a bright ornamental exterior face and may comprise stainless steel, anodized aluminum alloy, chrome plated steel or the like, or may comprise a metallic plating directly on the plastic backing 21.

The trim ring 20 illustrated in FIGS. 1–3 is designed to provide a decorative trim for an annular rim or tire supporting flange 22 of a typical vehicle wheel 23, FIG. 5, and comprises an annular radial flange 20a extending outwardly from the axially outer edge of an integral coaxial annular axial flange 20b. For economy and to minimize weight, the material of the trim ring 20 is too thin and flexible to permit its attachment directly to the wheel flange 22. Accordingly, the ring 20 is secured to the plastic backing and reinforcing member 21, as for example by inbent annular flanges 20c and 20d of ring 20 formed closely around outer and inner peripheral portions respectively of the backing member 21. The latter comprises an annular radial flange 21a that conforms to the adjacent axially inner surface of the flange 20a in form-sustaining relationship and extends radially outwardly from the axially outer edge of an integral coaxial annular axial flange 21b. The flange 21b conforms closely to the proximate inner surface of trim flange 20b in supporting relationship and comprises, with flange 21a, a unitary annular flange member 21.

The wheel 23 comprises a central spider forced into and welded to the annular rim flange 22 for supporting a conventional pneumatic tire, not shown. The flange 22 usually comprises a heavy gauge sheet metal stamping of steel or aluminum alloy having an annular axial flange portion 24 spacing an annular axially inner safety hump 25 from an outer annular radially outward extension 26 that terminates in an annular axially outwardly rounded flange adapted for attachment of wheel balancing weights 27, FIGS. 5–7. The radially outer surface of the axial flange portion 24 comprises the base of a groove for receiving the outer rim bead of a pneumatic tire.

The axial flange 21b is reinforced at a plurality of circumferentially spaced locations, eight in the present instance, by radially thickened bosses 28 of the molded material of the flange member 21. Each boss 28 has an axially inwardly opening recess 29 molded therein which, as illustrated in FIG. 4, has parallel radially spaced walls dimensioned to receive the long flat fixed leg 30a of a generally J-shaped stainless spring steel retention clip 30 snugly therein.

A plurality of sharp edged barbs or tabs 31 are lanced from the fixed leg 30a to extend therefrom radially outwardly and axially inwardly, FIGS. 9 and 10. By virtue of the inherent resiliency of the material of each clip 30 and its attachment with the radially inner ends of its tabs 31, the sharp outer edge of the tabs 31 resiliently engage and embed into the radially outer wall of the recess 29 and also urge the flat leg 30a radially inwardly against the opposite parallel radially inner wall of the recess 29.

Prior to assembly of each clip 30 within its associated recess 29, the tabs 31 extend radially in their unstressed condition sufficiently to effect an interference fit within the recess 29 and to yield resiliently radially inwardly to enable the initial insertion of the legs 30a into their associated recesses 29. Thereafter any attempt to remove a clip 30 from its recess 29 causes the sharp edges of the tabs 31 to dig even deeper into the adjacent recess wall.

As illustrated in FIG. 4, each recess 29 is enlarged radially outwardly along the circumferentially spaced edges of the associated leg 30a to provide a pair of radial shoulders 32 aligned with the mid-regions of the sharp edges of a corresponding pair of tabs 31. The corner edge of each shoulder 32 enhances the ability of the tab to dig into the hard material of the backing flange member 21 by increasing the tab pressure per unit area.

As illustrated in FIG. 10, three tabs 31 having sharp semi-circular edges 31a are adequate to retain the fixed leg 30a within its recess 29. Two tabs 31 are spaced circumferentially to engage the shoulders 32 and a central tab 31 engages the radially outer wall of the recess 29 at an intermediate location. In addition to being rounded as in FIG. 10, the sharp edges of the tabs 31 may comprise points 31b as in FIG. 11, short circumferentially extending edges 31c as in FIG. 12, or longer circumferentially extending knife edges 31d as in FIG. 13.

The shorter retaining leg 30b of each clip 30 extends radially and axially outwardly from the bight of the clip to a sharp end dimensioned to effect an interference fit within the annular flange portion 24 and to resiliently engage and embed thereinto by reason of the resilient connection with the leg 30a at said bight. The sharp end of the spring steel leg 30b that digs into the wall of the recess 29 may comprise a knife edge but is preferably pointed, as for example by being scalloped as illustrated in FIG. 14 to provide a few sharp prongs 33a, or by having its corner edges bent radially outwardly at right angles to the plane of the leg 30b to form the sharp barbs 33b, as illustrated in FIGS. 8 and 9.

Prior to formation of the prongs or barbs 33b, excess corner material at the outer end of leg 30b is cut away so that the axially outer edges 33c of the resulting prongs 33b (after the corner portions of the leg 30b are bent outwardly) will intersect the plane of the leg 30b at approximately an 80° angle to assure effective embedding of the prongs 33b into the adjacent wheel flange, yet enable the trim assembly 20, 21 to be pried loose from the vehicle wheel 23. The axially inner edge 33d of each prong or barb 33b preferably slopes toward the surface of the retaining leg 30b at a much shallower angle and thus serves as a cam to facilitate attachment of the trim assembly 20, 21 to the vehicle wheel 23 by camming the resiliently yieldable leg 30b radially inwardly to prevent the barbs 33b from biting appreciably into the wheel flange 24 when the trim assembly 20, 21 is moved axially inwardly during the attachment, as explained below.

A similar one-way cam action is accomplished by the pronged retaining leg 30b of FIG. 14, wherein the latter leg meets the surface of flange 24, 26 at a sufficiently shallow angle during attachment to the wheel to enable axial inward movement, yet sufficiently steep to prevent accidental removal. Thus the spring force urging the FIG. 14 retaining leg 30b radially outwardly causes the prongs or barbs 33a to embed into the adjacent wheel flange 24 and effectively resist axial outward movement as a result of normal operating forces.

Figure 16:
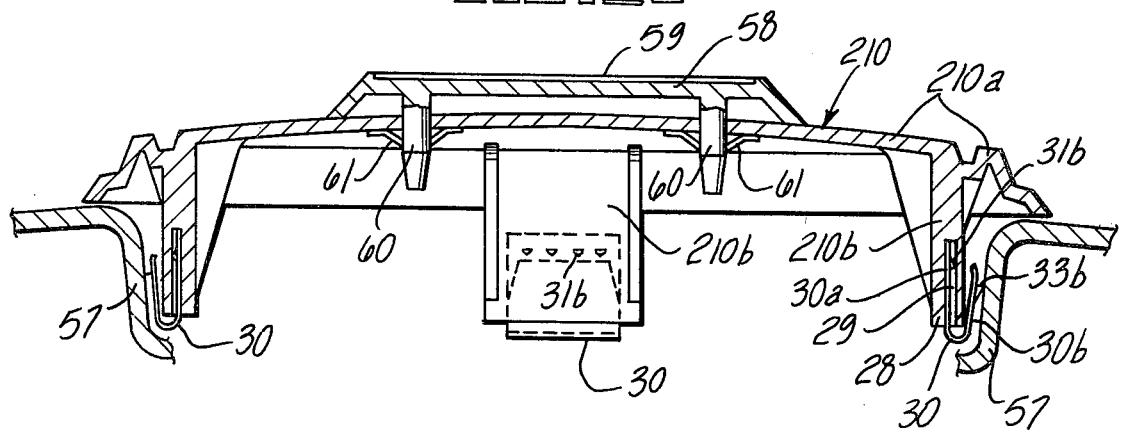
FIG. 16 is a sectional view taken in the direction of the arrows essentially along the line 15—15 of FIG. 16, showing the trim assembly secured to a vehicle wheel.

Between the barbs 33b, the leg 30b in FIGS. 8 and 9 extends axially and radially outwardly at 34 beyond the barbs 33b and terminates in a rounded cam edge 35 adapted to make initial engagement with the wheel flange 24, 26, or the wheel flange 57 of FIG. 16, and cam the leg 30b and barbs 33b radially inwardly to facilitate attachment of the trim assembly 20, 21 to the vehicle wheel. Shortly after the initial engagement of the cam edge 35 with the wheel flange, the cam edges 33d engage the wheel flange as the trim assembly is progressively forced axially inwardly to the final position attached to the vehicle wheel.

In accordance with the structure shown and described, the plastic flange member 21 with its bosses 28 and recesses 29 are molded as a unit. Thereafter the retention spring clips 30 and trim member 20 are secured to the member 21. If the resulting trim assembly 20, 21 is annular as shown, the trim member 20 may be secured to the backing member 21 by an additional flange 20d formed around the annular axially inner edge of the flange 21b, as shown in FIG. 5. However, the trim assembly may also comprise an entire wheel cover. In that case, the radial flange 20a will comprise a generally radial disc dimensioned to cover the entire wheel and the flange portion 20b will be deleted. The radial flange 21b will comprise a backing and reinforcement for the entire trim disc and will extend radially outwardly and inwardly from the axially outer portion of flange 21b in the manner of the flange 210b illustrated in FIG. 16.

It is apparent that axially extending annular flange portion 21b is dimensioned to extend freely coaxially into the axially extending annular wheel flange portion 24, and the resiliently yieldable retaining legs 30b will effect the above-described interference fit within the flange 24 and will yield resiliently radially inwardly to enable the trim assembly to be forced axially inwardly to the final secured position whereat the retaining barbs of the spring clip legs 30b embed into the wheel flange to resist removal.

At the final secured position, it is desirable that an annular clearance 36 exists between the flange 20c (reinforced by the backing flange 21a) and the axially outer periphery of the wheel rim flange 26 to enable insertion of a heavy screwdriver or similar tool for prying the trim assembly loose from its attachment with the vehicle wheel. The stack-up of dimensional tolerances in the usual mass-produced automobile wheel results in large dimensional variations. Without some provision to the contrary it is not possible to predetermine the desired clearance 36. Also, in order to assure the desired rigidity for the backing and reinforcing flange member 21 and to preserve the angle between the annular flange portions 21a and 21b, a plurality of circumferentially spaced reinforcing webs 37 of the material of the flange member 21 are molded integrally with the flanges 21a and 21b at their internal juncture.

Each flange 37 is dimensioned to provide a radial shoulder 37a located at a predetermined distance axially inwardly of flange 21a to comprise a locating stop adapted to engage the wheel flange 26 and thereby determine the desired clearance 36 when the trim assembly is attached to the vehicle wheel at the aforesaid final secured position. The reinforcing flanges 37 and their movement-limiting shoulders 37a may or may not correspond in number to the recesses 29 or the modified retention devices illustrated in other views. Accordingly, the shoulders 37a are not necessarily aligned with these retention devices and are not shown in the other sectional views.

The fixed legs 30a may be molded into the recesses 29 during the initial molding of the flange member 21. However, the clips 30 and the flange member 21 with its axially opening recesses 29 are preferably formed separately. The clips 30 are then secured to the flange member 21 by forcing the legs 30a into the axially open ends of the recesses 29 as described above. Thus the mold for the flange member 21 and the operation of molding the latter are simplified and the assembly of the clips 30 with the member 21 can be completed at a location remote from the molding operation.

The structure and operation of the parts illustrated in FIGS. 5 and 6 are essentially the same as the corresponding parts described above. The significant difference is that a plurality of circumferentially spaced reinforcing webs 38 and resilient arms 39 of the same molded material as the flange member 21 are molded integrally therewith. Each arm 39 extends axially inwardly from its web 38 in radially outwardly spaced relationship with respect to the flange portion 21b. The axially inner end of each arm 39 comprises an integral enlargement of the same material as the member 21 and molded as a unit therewith. The inner enlargement of the several arms 39 may be connected circumferentially to complete a single annular spike retainer 40 for a plurality of radial spikes 41. The latter may comprise steel or aluminum alloy nail-like members, for steel or aluminum vehicle wheels respectively, having their inner ends secured within the retainer 40 and extending outwardly to sharp ends adapted to engage and embed into the wheel flange 22.

The sharp end of each nail or spike 41 preferably comprises a beveled edge that slopes axially and radially outwardly to effect a sharp point or chisel edge capable of cutting into the material of the flange 22 when the trim assembly 20, 21 is secured to the vehicle wheel as show in FIGS. 5 and 6. The beveled outer ends of the spikes 41 also facilitate their axial inward movement to the securing or attached position illustrated and resist their axially outward displacement under normal operating forces. The inherent resiliency of the hard molded material of the flange member 21 is utilized to provide the necessary resiliency for the arms 39 which effects the desired interference fit and embedding of the spikes 41 into the wheel flange 22.

In FIG. 5, the retainer 40 is located to urge the spikes 41 yieldingly into engagement with flange 22 within the annular channel 42 radially opposite the safety hump 25 and adjacent a shoulder 43 defining the axially outer wall of channel 42, thereby to provide an added safeguard against accidental removal of the trim assembly 20, 21. However, such a safeguard is not essential when the spikes 41 are urged radially outwardly with sufficient force against the wheel flange 22. In such a case, a shoulder comparable to shoulder 43 is not essential for adequate retention, as illustrated in FIG. 6.

In the above regard, the provision of an annular spike retainer 40 materially increases the resilient force urging the spikes 41 radially against the flange 22 because the radial yielding of the arms 39 necessitates a dimensional change tending to compress the annular retainer 40. Such a dimensional change is of course yieldingly resisted by the resiliency of the support 40, usually cause it to buckle resiliently between the arms 39 when the trim assembly 20, 21 is secured to the vehicle wheel. In consequence, the annular support 40 integral with the ends of the arms 39 increases the effectiveness of the retention device illustrated and widens the choice of plastic materials from which a suitable flange member 21 may be molded.

FIG. 7 illustrates a retention having some of the characteristics of that of FIG. 5. A plurality of spring steel clips 44 replace the resilient plastic arms 39, retainer 40, and spikes 41. A plurality of reinforcing web structures 45 of the material of flange 21 and molded integrally with the flanges 21a and 21b at circumferentially spaced locations reinforce the flange member 21 in the manner of webs 37 and 38 and also provide a plurality of circumferentially spaced axially inwardly extending platforms 46 spaced radially outwardly from the flange 21b. Each platform 46 has an opening 47 for retaining the hairpin end of one of the clips 44. Each hairpin end comprises an arm 48 that extends axially inwardly from its bight and adjacent to the radial outer surface of flange portion 21b in supported engagement. The other arm 39 of each hairpin end engages the axially outer edge of the opening 47, and terminates in a radially inbent end that resiliently engages the axially inner end of opening 47 with the adjacent radially inner portion of the platform 46 with spring force urging the bight axially against the flange 21a and the arm 48 against the flange 21b. The structure of clip 44 described thus far is similar to that described in the above-noted Kretschmer patent. Reference is hereby made to that patent for additional details of structure and operation.

From the axially inner end of the hairpin end 48, the clip 44 inclines at 51 radially outwardly and axially inwardly from the flange 21b to space an intermediate portion 52 of clip 44 radially from the flange 21b. The axially inner end of the intermediate portion 52 curves radially and axially outwardly in a reverse loop 53 to an axially inner rounded cam portion 54 that slopes radially and axially outwardly and merges with an axially outer rounded cam portion 55 that slopes radially inwardly and axially outwardly. When the trim assembly 20, 21 is attached to the vehicle wheel 23, the rounded cam portions 54, 55 of the plurality of circumferentially spaced clips 44 seat within the annular channel 42 and are resiliently forced therein at an interference fit by the resiliency of the clip 44 and in particular the resiliency of the intermediate portions 51, 52. Paired parallel radially and axially extending guide walls 56 of each web structure 45 are closely spaced by the associated clip 44 to confine the latter against circumferential movement.

It is apparent from the structure described that after formation of the clips 44 and molding of the flange member 21, the clips 44 may be assembled by inserting into the channel between a pair of the guide walls 56 and thereafter forcing the clips 44 axially outwardly toward the platform 46. When the inclined hairpin arm 49 engages the axially inner edge of the platform 45, the engagement cams the arm 49 and the inbent end 50 radially inwardly against the spring force effected primarily at the bight of the hairpin loop. When the inbent end 50 reaches the opening 47, the arm 49 snaps outwardly into the interlocking engagement with the flange member 21 illustrated. Thereafter, when the trim assembly 20, 21 is forced axially toward the vehicle wheel, the inner cam surface 54 will first engage the outer portions of the annular wheel flange 24 and cam the portions 54, 55 axially outward against the spring force at the loop 53 and radially inwardly against the spring force of the clip portions 51, 52, permitting passage of the cam portions 54, 55 to the securing or attached position shown whereat they will snap into the channel 42 and interlock with the wheel flange 22.

The cam portion 55 operates similarly by engaging the shoulder 43 to enable removal of the trim assembly by use of a prying tool in the clearance 36. It is to be noted however that the axially and radially outward extension of the clip 44 from the loop 53, which readily yields resiliently toward flange 21 to facilitate attachment of the trim assembly 20, 21 to the wheel 23, tends to swing away from flange 21 about the loop 53 when force is applied to remove the trim assembly from the wheel 23. As the inclined surface 55 is cammed radially inwardly by shoulder 43 during the removal, the loop 53 serves as a resilient strap hinge about which the surface 55 swings radially outwardly with respect to the intermediate clip portion 52. In consequence the portion 52 must yield radially inwardly more during removal than is required during the attachment. Thus greater force must be applied to remove the trim assembly than is required to attach it to the wheel.

FIGS. 15 and 16 illustrate an application of the invention for securing a hub cover to the wheel 23. In this case the spider of the wheel 23 is provided with an axially extending annular flange 57 coaxially around the wheel hub for attachment of a trim assembly. The latter comprises a flange member 21 to provide a radial flange 210a and axial flange 210b comparable to the flanges 21a, 21b. In FIG. 16, however, instead of being annular, the radial flange 210a extends as a disc to completely cover the wheel hub. The outer face of flange 210a may be covered with a lightweight bright metal trim member comparable to member 20 and secured to the flange 210a as in FIG. 2, or a plastic support 58 for a medallion 59 may be secured to the flange 210a. In the present instance, a pair of prongs 60 integral with the support 58 extend axially therefrom through holes in the flange 210a and are secured by conventional resilient spider retainers 61.

The flange 210b is provided with an axially inwardly opening recess 29, as in FIG. 2, within which is secured a spring retention clip 30 as described above. Barbs 33b as illustrated also in FIGS. 8 and 9 are used to hold the flange member 210 at the position shown, attached to the vehicle wheel.

What is claimed is:

1. In means for decorating the axially outer face of a vehicle wheel having an annular wheel flange, the combination of flange means of molded material having an annularly arranged axial flange portion adapted to extend coaxially within the wheel flange, the axial flange portion having a plurality of circumferentially spaced clip-securing recesses opening axially inwardly, a plurality of spring steel retention clips associated with the recesses respectively, each clip comprising a radially thin axial extension within the associated recess and extending axially inwardly from the axial opening of the recess, each clip also comprising a retaining extension spaced radially outwardly from the axial flange portion for resiliently engaging the wheel flange and extending axially outwardly from a resilient connection with the axially inner end of the axial extension, the outer portion of the retaining extension having barb means arranged for angularly engaging the radially inner surface of the wheel flange with an interference fit and embedding thereinto at a securing position for securing the flange means against axial movement from the wheel, the retaining extension also comprising cam means for engaging the axial wheel flange to cam the retaining extension and barb means radially inwardly for axial passage to the securing position, and means for securing the axial extension within the associated recess comprising an integral tab of the clip extending axially inwardly and radially from a resilient connection with the axial extension and resiliently engaging and embedding into the radially adjacent inner surface of the associated recess at an interference fit, the resilient connection of the tab with the axial extension being under stress yieldingly urging the axial extension radially against the inner surface of the recess opposite said radially adjacent surface engaged by the tab, the flange means also having an annularly arranged radial flange portion coaxial with the axial flange portion and extending radially outwardly from an axially outer portion thereof, an annular thin lightweight metallic trim member secured to the axially outer surface of the flange means, the latter surface conforming the contours of the axially inner surface of the trim member in form-sustaining relationship, and means for securing the trim member to the flange means comprising the outer annular edge of the trim member formed around the radially outer edge of the radial flange portion and the inner annular edge of the trim member formed around the axially inner edge of the axial flange portion.

2. In means for decorating the axially outer face of a vehicle wheel having an annular wheel flange, the combination of flange means of form-sustaining molded material having an annularly arranged axial flange portion adapted to extend coaxially within the wheel flange, a plurality of circumferentially spaced spring steel retention clips the axial flange portion having a plurality of circumferentially spaced clip-securing recesses opening axially inwardly and associated with said retention clips respectively, each clip having a radially thin axial extension secured within the associated recess and extending axially inwardly therefrom and being resiliently secured at its axially inner end to a retaining extension of that clip, each retaining extension being resiliently engageable with the axial wheel flange for securing the flange means against axial movement from the wheel, the flange means also having an annularly arranged radial flange portion coaxial with the axial flange portion and extending radially outwardly from an axially outer portion thereof, an annular thin lightweight metallic trim member secured to the axially outer surface of the flange means, and means for securing the trim member to the flange means comprising the outer annular edge of the trim member formed around the radially outer edge of the radial flange portion and the inner annular edge of the trim member formed around the axially inner edge of the axial flange portion.

3. In combination, annular flange means of molded material, means for securing the flange means to the axially outer face of a vehicle wheel comprising a clip-securing recess in said flange means having a pair of radially spaced inner surfaces and opening at its axially inner end, a spring steel retention clip having an axial extension within the recess and projecting therefrom through said opening to a retaining portion of the clip adapted to engage a vehicle wheel for attachment therewith, and means for securing the extension within the recess comprising an integral tab of said extension, the tab having a resilient connection with the extension and extending angularly therefrom to a sharp edge resiliently engaging one of said inner surfaces of the recess with sufficient force to embed thereinto and to urge the extension against the inner surface of the recess opposite said one surface engaged by the tab, the tab being resiliently yieldable to facilitate the initial insertion of the axial extension into the recess, said one inner surface of the recess having an offset portion defining a shoulder of said molded material aligned with the tab and arranged so that a portion of the sharp edge of the tab overlies and is spaced from the offset portion by said shoulder and another portion of said sharp edge embeds into said material of said one inner surface at said shoulder.

4. The combination according to claim 3, said clip-securing recess comprising one of a plurality of comparable circumferentially spaced clip-securing recesses in said flange means, and said spring steel retention clip comprising one of a corresponding plurality of comparable spring clips associated with said recesses respectively, each axial extension comprising sheet spring steel and the tab thereof extending angularly therefrom in the direction toward the axial inner end of the associated recess.

5. In means for decorating the axially outer face of a vehicle wheel having an annular wheel flange, the combination of flange means of molded material having an annularly arranged axial flange portion adapted to extend coaxially within the wheel flange, the axial flange portion having a plurality of circumferentially spaced clip-securing recesses opening axially inwardly and defined by a pair of parallel walls closely spaced radially, a plurality of spring steel retention clips associated with the recesses respectively, each clip comprising a radially thin axial extension between said walls within the associated recess and extending axially inwardly from the axial opening of the recess, each clip also comprising a retaining extension spaced radially outwardly from the axial flange portion for resiliently engaging the wheel flange and extending axially outwardly from a resilient connection with the axially inner end of the axial extension, the outer portion of the retaining extension having barb means arranged for angularly engaging a radially inner surface of the wheel flange with an interference fit and embedding thereinto at a securing position for securing the flange means against axial movement from the wheel, the retaining extension also comprising cam means for engaging the axial wheel flange to cam the retaining extension and barb means radially inwardly for axial passage to the securing position, and means for securing the axial extension within the associated recess comprising an integral tab of the clip extending angularly and radially from a resilient connection with the axial extension to a sharp edge resiliently engaging the radially adjacent one of said walls with sufficient force to embed thereinto and to urge the axial extension radially against the opposite one of said walls, each tab being resiliently yieldable towards the axial extension to facilitate the initial insertion of the latter extension into the associated recess, said adjacent wall of each recess engaged by the tab having a radially offset portion defining a shoulder of said molded material extending axially and aligned with the tab so that a portion of the sharp edge of the tab overlies and is spaced by the shoulder from the offset portion and another portion of the sharp edge embeds into said material of said adjacent wall at said shoulder.

* * * * *